(12) United States Patent
Biskup et al.

(10) Patent No.: US 9,997,763 B2
(45) Date of Patent: *Jun. 12, 2018

(54) HIGH CURRENT BATTERY PACK FUSING SYSTEM

(71) Applicant: Atieva, Inc., Menlo Park, CA (US)

(72) Inventors: Richard J. Biskup, Sunnyvale, CA (US); Jean-Philippe Gauthier, San Francisco, CA (US)

(73) Assignee: ATIEVA, INC., Menlo Park, CA (US)

( * ) Notice: Subject to any disclaimer, the term of this patent is extended or adjusted under 35 U.S.C. 154(b) by 409 days.

This patent is subject to a terminal disclaimer.

(21) Appl. No.: 14/940,578

(22) Filed: Nov. 13, 2015

(65) Prior Publication Data

US 2017/0141379 A1    May 18, 2017

Related U.S. Application Data

(63) Continuation-in-part of application No. 14/940,468, filed on Nov. 13, 2015, now Pat. No. 9,899,658.

(51) Int. Cl.
| | |
|---|---|
| *H01M 2/34* | (2006.01) |
| *H01M 2/20* | (2006.01) |
| *H01H 85/12* | (2006.01) |
| *H01H 85/055* | (2006.01) |
| *H01H 85/38* | (2006.01) |

(52) U.S. Cl.
CPC .......... *H01M 2/348* (2013.01); *H01H 85/055* (2013.01); *H01H 85/12* (2013.01); *H01M 2/206* (2013.01); *H01H 2085/381* (2013.01); *H01M 2200/103* (2013.01); *H01M 2220/20* (2013.01)

(58) Field of Classification Search
CPC ....................... H01M 85/055–85/12
USPC ....... 361/626, 630, 833, 837, 425, 103–104, 361/111
See application file for complete search history.

(56) References Cited

U.S. PATENT DOCUMENTS

| | | | | |
|---|---|---|---|---|
| 3,265,841 | A * | 8/1966 | Greber .................. | H01H 85/42 337/219 |
| 5,357,184 | A * | 10/1994 | McGowan .......... | H01H 85/044 320/126 |
| 2010/0291426 | A1* | 11/2010 | Zhou ..................... | H01H 85/08 429/99 |
| 2013/0337299 | A1 | 12/2013 | Sugawara | |
| 2014/0154530 | A1 | 6/2014 | Fujiwara | |
| 2014/0280185 | A1 | 9/2014 | Nordstrom | |
| 2017/0018750 | A1* | 1/2017 | Wintner ................ | H01M 2/206 |
| 2017/0047572 | A1* | 2/2017 | Biskup ................ | H01M 10/655 |

* cited by examiner

*Primary Examiner* — Maria Laios
*Assistant Examiner* — Robert S Carrico
(74) *Attorney, Agent, or Firm* — Patent Law Office of David G. Beck

(57) ABSTRACT

A high current fuse with a short time constant is provided for use in an electric vehicle. The fuse is designed to exhibit thermal characteristics that are similar if not substantially identical to those of the wire bond interconnects used in the vehicle's battery pack. As a result, the system does not go into an overheat protection condition when the system is subjected to repetitive high current cycles, such as those common during aggressive and/or spirited driving. The fuse includes an arc suppressor.

21 Claims, 9 Drawing Sheets

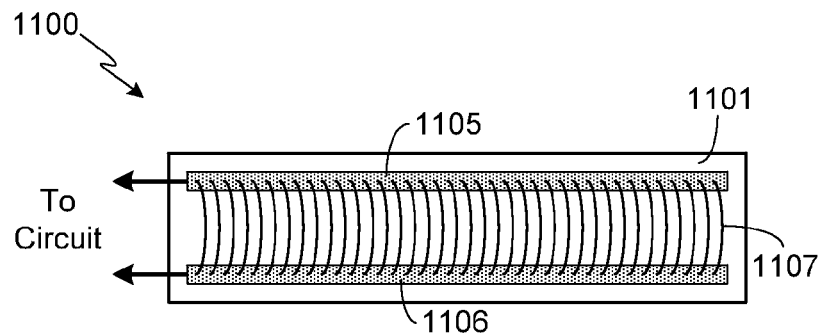
FIG. 11
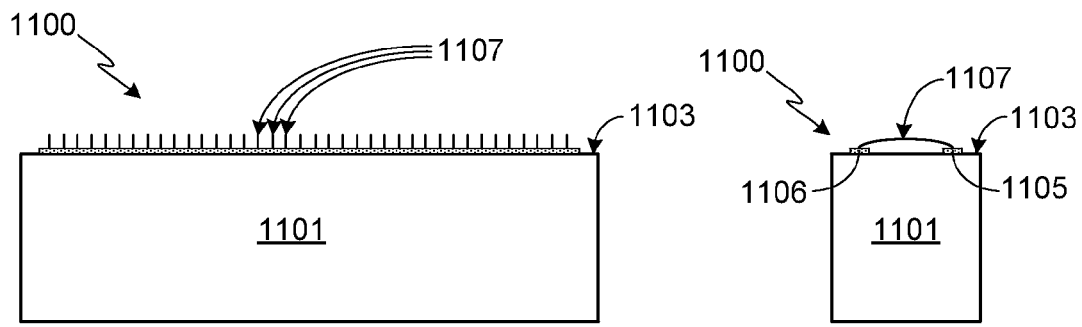
FIG. 12
FIG. 13
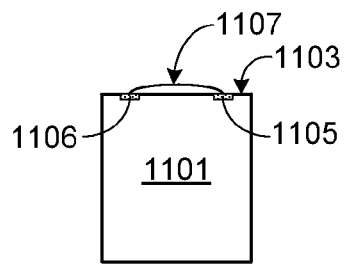
FIG. 14

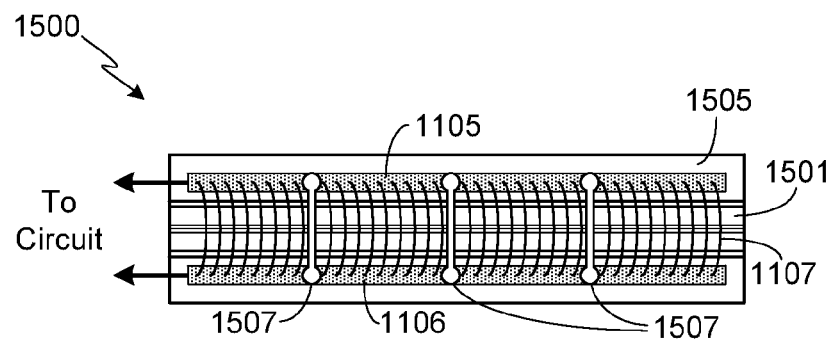
FIG. 15
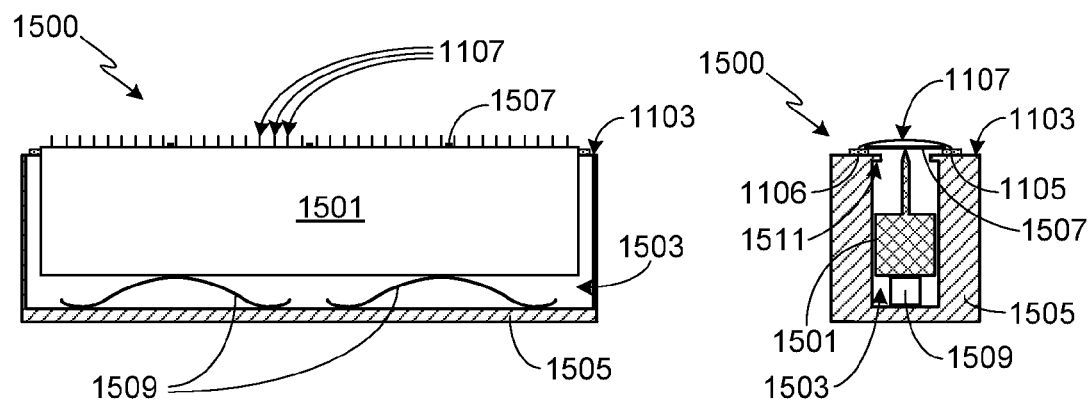
FIG. 16
FIG. 17

HIGH CURRENT BATTERY PACK FUSING SYSTEM

CROSS-REFERENCE TO RELATED APPLICATION

This application is a continuation-in-part of U.S. patent application Ser. No. 14/940,468, filed 13 Nov. 2015, the disclosure of which is incorporated herein by reference for any and all purposes.

FIELD OF THE INVENTION

The present invention relates generally to battery systems and, more particularly, to a fusing system compatible with the high current, high power battery pack of an electric vehicle.

BACKGROUND OF THE INVENTION

In response to the demands of consumers who are driven both by ever-escalating fuel prices and the dire consequences of global warming, the automobile industry is starting to embrace the need for ultra-low emission, high efficiency cars. While some within the industry are attempting to achieve these goals by engineering more efficient internal combustion engines, others are incorporating hybrid or all-electric drive trains into their vehicle line-ups.

In recent years electric vehicles (EVs) have proven to be not only environmentally friendly, but also capable of meeting, if not exceeding, consumer desires and expectations regarding performance, range, reliability, and cost. In order to insure both vehicle reliability and user safety, electric vehicles use a variety of techniques to prevent battery pack abuse as well as mitigate the effects of an unavoidable abusive event (e.g., battery pack damaged during a collision, etc.). Fuses, which may be employed at the battery level, the battery pack level, or both, are one of the primary means of protecting an EV's battery pack. Unfortunately while fuses may be used to provide very effective protection in a low current circuit, due to the high current levels common in an EV the response time of a fuse may be too slow to provide the desired level of protection. This phenomenon is illustrated in FIG. 1 which provides the cutoff current characteristics for a variety of conventional high current fuses ranging from a 300 amp fuse to an 800 amp fuse. As expected, as the current rating of the fuse increases, so does the time it takes to blow the fuse for a given current level. Thus for the set of exemplary fuses shown in FIG. 1, a 300 amp fuse subjected to 1000 amps of current will take approximately 8 seconds to blow while a 600 amp fuse may take as much as 200 seconds to blow at the same current level. Subjecting an EV's electrical system to an overcurrent of such magnitude and for such an extended period of time may damage the battery pack. To avoid this problem, the fuse within an EV's power train is typically undersized to insure that the fuse will blow quick enough to protect the various battery pack and drive train components. For example, assuming that the EV battery pack uses wire bond battery interconnects that typically are only capable of withstanding 1000 amps for approximately 10 seconds, based on the above fuse data a 300 amp fuse would be required to insure adequate protection.

Unfortunately while undersizing the fuse may provide the desired level of protection for the battery pack, under certain routine conditions the fuse may blow prematurely. In part this is due to the thermal characteristics of the wire bond versus those of the fuse. FIG. 2 graphically illustrates the heat-up and cool-down cycling of a wire bond interconnect (curve 201) versus that of a 300 amp fuse (curve 203) as the system is subjected to a series of aggressive current pulses as illustrated in FIG. 3. Such a pulse pattern may be due, for example, from an aggressive driving pattern such as those that may occur during street racing or otherwise spirited driving. As shown, eventually the fuse becomes too hot, resulting in the system going into an overheat protection condition, i.e., the fuse blows prematurely.

Accordingly, what is needed is a fuse that provides a rapid response to excessive currents while still insuring that the fuse will not blow during normal vehicle operation. The present invention provides such a system.

SUMMARY OF THE INVENTION

The present invention provides an electric circuit comprised of a battery pack, a fuse assembly and an electrical load. The battery pack includes a plurality of batteries, a first battery pack bus bar, and a first plurality of wire bond interconnects that electrically connect the plurality of batteries to the first battery pack bus bar, where a first end portion of each wire bond interconnect is attached to the first battery pack bus bar, where a second end portion of each wire bond interconnect distal from the first end portion is attached to a first battery terminal of a corresponding one of the plurality of batteries, and where each of the first plurality of wire bond interconnects is fabricated from a first material and is of a first wire gauge. The fuse assembly, which is configured to blow during a current spike and prior to the first plurality of wire bond interconnects being damaged, is comprised of a first fuse bus bar, a second fuse bus bar, and a second plurality of wire bond interconnects that electrically connect the first fuse bus bar to the second fuse bus bar, where the second plurality of wire bond interconnects are connected in parallel between the first and second fuse bus bars, where each of the second plurality of wire bond interconnects is fabricated from the first material and is of the first wire gauge, and where the total number of wire bond interconnects of the fuse assembly (i.e., the second plurality of wire bond interconnects) is less than the total number of parallel connected wire bond interconnects of the battery pack (i.e., the first plurality of wire bond interconnects). The fuse assembly is further comprised of an arc suppression member and a spring assembly, where the spring assembly forces a portion of the arc suppression member between the first and second fuse bus bars when the second plurality of wire bond interconnects blow during a current spike.

In one aspect, the fuse assembly may further comprise at least one fusible link that electrically connects the first fuse bus bar to the second fuse bus bar, where the at least one fusible link is fabricated from a second material, where the resistivity of the second material is higher than the resistivity of the first material, where the at least one fusible link maintains the arc suppression member in a first position prior to the current spike, where the at least one fusible link fuses after the second plurality of wire bond interconnects blow during the current spike, where when the at least one fusible link fuses the spring assembly forces the arc suppression member into a second position, and where the arc suppression member in the second position locates a portion of the arc suppression member between the first and second fuse bus bars. The resistivity of the at least one fusible link is at least 2 times the resistivity of the wire interconnects; alternately, the resistivity of the at least one fusible link is at least 10 times the resistivity of the wire interconnects;

alternately, the resistivity of the at least one fusible link is at least 100 times the resistivity of the wire interconnects; alternately, the resistivity of the at least one fusible link is at least 1,000 times the resistivity of the wire interconnects.

In another aspect, the fuse assembly may further comprise an electrically insulating base (e.g., a plastic base), where the first and second fuse bus bars are attached to a surface of the base. The base may include a channel positioned between the first and second fuse bus bars, where the arc suppression member is located within the channel. A spring assembly may also be located within the channel, for example positioned between a second surface of the base and a lower surface of the arc suppression member. The fuse assembly may further comprise at least one fusible link that electrically connects the first fuse bus bar to the second fuse bus bar, where the at least one fusible link is fabricated from a second material, where the resistivity of the second material is higher than the resistivity of the first material, where the at least one fusible link maintains the arc suppression member in a first position within the channel prior to the current spike, where the at least one fusible link fuses after the second plurality of wire bond interconnects blow during the current spike, where when the at least one fusible link fuses the spring assembly forces the arc suppression member into a second position, and where the arc suppression member in the second position extends at least partially out of the channel and is located between the first and second fuse bus bars. The fuse assembly may be configured such that the upper surface of the base is coplanar with both the upper surface of the first fuse bus bar and the upper surface of the second fuse bus bar. The first and second bus bars may be molded into, or bonded to, or otherwise attached to, the surface of the base.

In another aspect, the battery pack may further comprise a second battery pack bus bar and a third plurality of wire bond interconnects that electrically connect the plurality of batteries to the second battery pack bus bar, where a first end portion of each wire bond interconnect is attached to the second battery pack bus bar, where a second end portion of each wire bond interconnect distal from the first end portion is attached to a second battery terminal of a corresponding one of the plurality of batteries, and where each of the third plurality of wire bond interconnects is fabricated from the first material and is of the first wire gauge. The first plurality of wire bond interconnects may be coupled to the plurality of batteries and to the first battery pack bus bar utilizing a bonding technique selected from the group consisting of ultrasonic bonding, resistance bonding, thermocompression bonding, thermosonic bonding and laser bonding. The second plurality of wire bond interconnects may be coupled to the first and second fuse bus bars utilizing a bonding technique selected from the group consisting of ultrasonic bonding, resistance bonding, thermocompression bonding, thermosonic bonding and laser bonding. The third plurality of wire bond interconnects may be coupled to the plurality of batteries and to the second battery pack bus bar utilizing a bonding technique selected from the group consisting of ultrasonic bonding, resistance bonding, thermocompression bonding, thermosonic bonding and laser bonding. The first and second battery pack bus bars may be fabricated from aluminum or copper.

In another aspect, the total number of wire bond interconnects corresponding to the second plurality of wire bond interconnects is equivalent to between 70 and 99 percent of the total number of wire bond interconnects corresponding to the first plurality of wire bond interconnects; alternately, the total number of wire bond interconnects corresponding to the second plurality of wire bond interconnects is equivalent to between 80 and 95 percent of the total number of wire bond interconnects corresponding to the first plurality of wire bond interconnects; alternately, the total number of wire bond interconnects corresponding to the second plurality of wire bond interconnects is equivalent to between 85 and 90 percent of the total number of wire bond interconnects corresponding to the first plurality of wire bond interconnects.

A further understanding of the nature and advantages of the present invention may be realized by reference to the remaining portions of the specification and the drawings.

BRIEF DESCRIPTION OF THE DRAWINGS

It should be understood that the accompanying figures are only meant to illustrate, not limit, the scope of the invention and should not be considered to be to scale. Additionally, the same reference label on different figures should be understood to refer to the same component or a component of similar functionality.

FIG. 11 provides a top view of a fuse assembly in accordance with the invention;

FIG. 12 provides a first side view of the assembly shown in FIG. 11;

FIG. 13 provides a second side view of the assembly shown in FIG. 11;

FIG. 14 provides a side view of the fuse assembly of FIG. 11, similar to that shown in FIG. 13, except that the bus bars are integrated into the base such that the top surfaces of the bus bars are coplanar with the top surface of the base;

FIG. 15 provides a top view of a fuse assembly in accordance with an alternate embodiment of the invention;

FIG. 16 provides a first cross-sectional view of the assembly shown in FIG. 15;

FIG. 17 provides a second cross-sectional view of the assembly shown in FIG. 15;

DESCRIPTION OF THE SPECIFIC EMBODIMENTS

As used herein, the singular forms "a", "an" and "the" are intended to include the plural forms as well, unless the context clearly indicates otherwise. The terms "comprises", "comprising", "includes", and/or "including", as used herein, specify the presence of stated features, integers, steps, operations, elements, and/or components, but do not preclude the presence or addition of one or more other features, process steps, operations, elements, components, and/or groups thereof. As used herein, the term "and/or" and the symbol "/" are meant to include any and all combinations of one or more of the associated listed items. Additionally, while the terms first, second, etc. may be used herein to describe various steps, calculations or components, these steps, calculations or components should not be limited by these terms, rather these terms are only used to distinguish one step, calculation or component from another. For example, a first calculation could be termed a second calculation, and, similarly, a first step could be termed a second step, without departing from the scope of this disclosure.

In the following text, the terms "battery", "cell", and "battery cell" may be used interchangeably and may refer to any of a variety of different battery configurations and chemistries. Typical battery chemistries include, but are not limited to, lithium ion, lithium ion polymer, nickel metal hydride, nickel cadmium, nickel hydrogen, nickel zinc, and silver zinc. The term "battery pack" as used herein refers to an assembly of batteries electrically interconnected to achieve the desired voltage and capacity, where the battery assembly is typically contained within an enclosure. The terms "electric vehicle" and "EV" may be used interchangeably and may refer to an all-electric vehicle, a plug-in hybrid vehicle, also referred to as a PHEV, or a hybrid vehicle, also referred to as a HEV, where a hybrid vehicle utilizes multiple sources of propulsion including an electric drive system.

Figure 1:
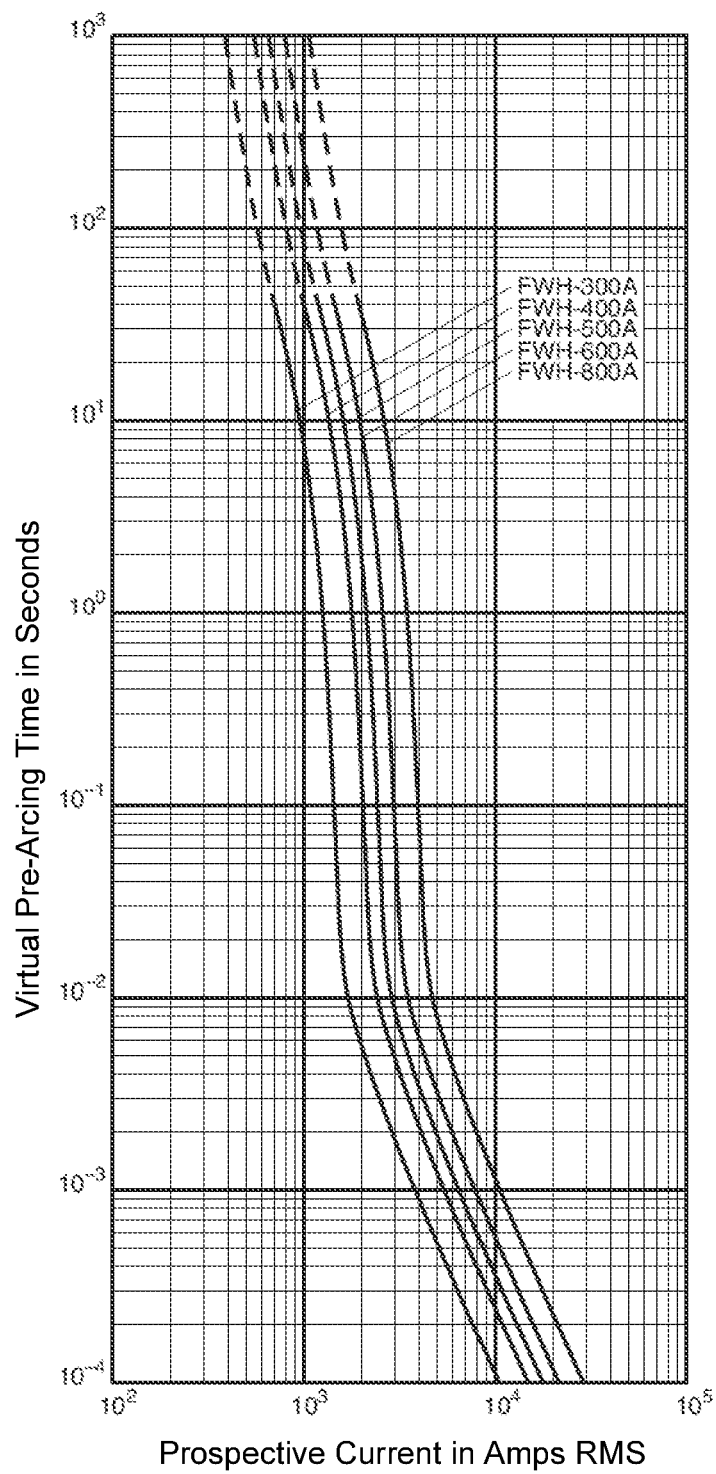
FIG. 1 illustrates the cutoff current characteristics of a variety of conventional high current fuses.
Figure 2:
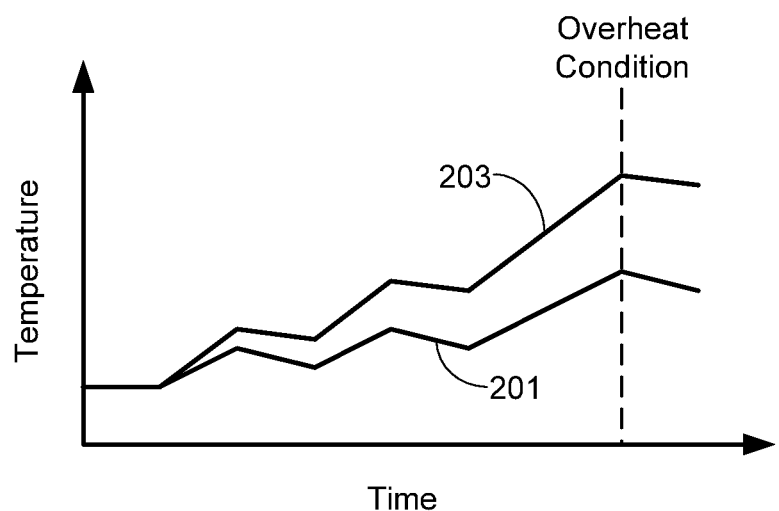
FIG. 2 graphically illustrates the thermal characteristics of a wire bond versus a fuse.
Figure 3:
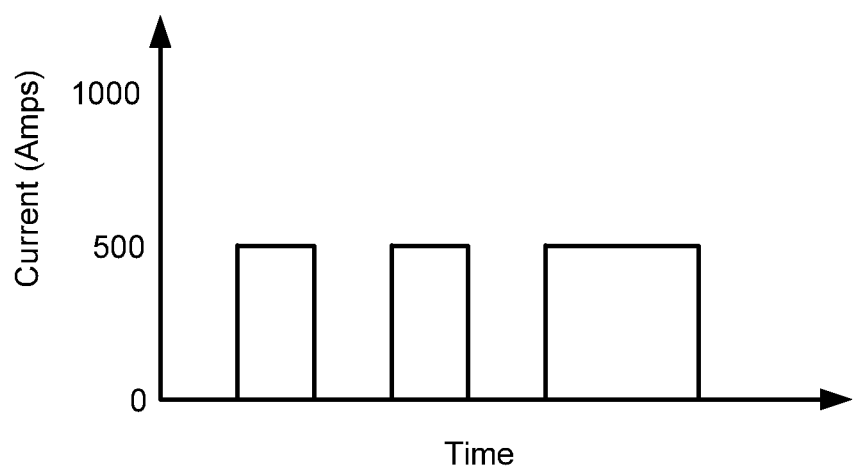
FIG. 3 illustrates the current pulse pattern used to obtain the thermal characteristics shown in FIG. 2.
Figure 4:
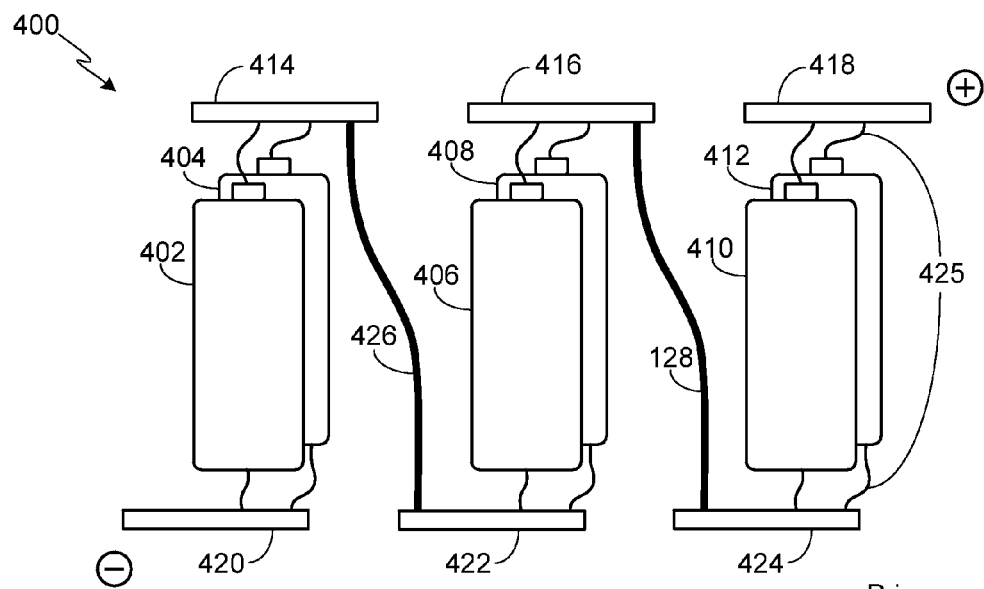
FIG. 4 provides a schematic diagram of a battery pack with bus bars above and below the battery cells in accordance with the prior art.

FIG. 4 illustrates a portion of an exemplary battery pack 400 utilizing a conventional battery pack configuration in which the battery interconnects (e.g., wire bonds) are attached to both the upper and lower portions of the batteries. As shown, battery pack 400 includes a first group of batteries 402 and 404 connected in parallel, a second group of batteries 406 and 408 connected in parallel, and a third group of batteries 410 and 412 connected in parallel. The first, second and third groups of batteries are connected in series. Bus bars 414, 416, 418, 420, 422, 424 are used to connect the batteries in this parallel and series arrangement. Each of the bus bars is coupled to the respective batteries with one or more interconnects 425 (e.g., wire bonds). A relatively thick wire 426 couples the second bus bar 414 to the third bus bar 422, making a series connection between the first and second battery groups, while a second relatively thick wire 428 couples the fourth bus bar 416 to the fifth bus bar 424, making a series connection between the second and third battery groups. As a result, the first bus bar 420 is the negative terminal while the sixth bus bar 418 is the positive terminal for battery pack 400.

The use of bus bars at both ends of the batteries as illustrated in FIG. 4 requires a relatively complex manufacturing process in order to (i) attach the battery interconnects 425 between the battery end surfaces and the bus bars, and (ii) attach the wires (e.g., wires 426 and 428) that couple the upper bus bars to the lower bus bars. Wires 426 and 428 are also problematic in the sense that they can introduce parasitic resistance into the current path, which in turn can introduce a voltage drop under high current drain conditions. Additionally this configuration prevents, or at least limits, the ability to efficiently remove battery pack heat by affixing a heat sink to a battery end surface.

Figure 5:
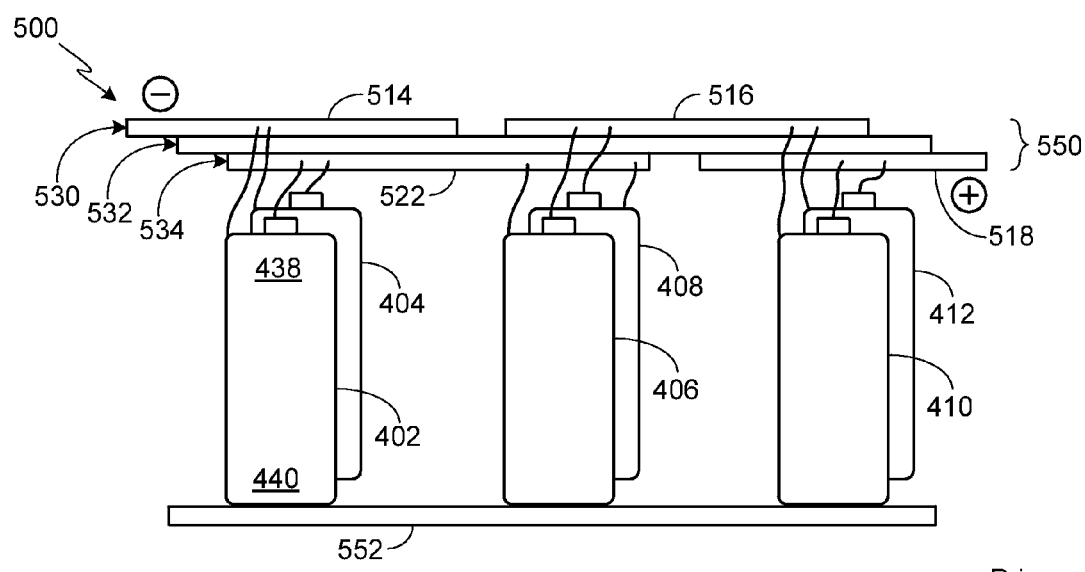
FIG. 5 provides a schematic diagram of a battery pack with both bus bars adjacent to one end of each of the battery cells in accordance with the prior art.

FIG. 5 illustrates a battery pack 500 utilizing an alternate conventional battery pack configuration in which all the bus bars are proximate to one end of the battery pack, thus enabling efficient heat removal from the other end of the battery pack. Furthermore, by locating bus bars 514, 516, 518 and 522 proximate to one end of the batteries, fewer bus bars are required than in battery pack 400. The relatively thick wires 426 and 428 from the upper bus bars to the lower bus bars are also eliminated in the embodiment shown in FIG. 5.

Access to both the positive and negative terminals in battery pack 500 is at one end of the cells, i.e., at the top end of the cells, where the bus bars are coupled to the positive and negative terminals using battery interconnects (e.g., wire bonds). As in the prior arrangement, the first group of batteries 402 and 404 are connected in parallel, the second group of batteries 406 and 408 are connected in parallel, and the third group of batteries 410 and 412 are connected in parallel. The first, second and third groups of batteries are connected in series. Bus bars 514, 516, 518, 522 are used to couple the batteries in this parallel and series arrangement. Specifically, starting with the negative terminal of battery pack 500, a first bus bar 514 is connected to the negative terminals of the first group of batteries 402 and 404 while a second bus bar 522 is connected to the positive terminals of the same group of batteries 402 and 404, both at the top end portion 438 of each of the batteries. The first and second bus bars 514 and 522 couple the first group of batteries 402 and 404 in parallel. Similarly, the second bus bar 522 and the third bus bar 516 couple the second group of batteries 406 and 408 in parallel, while the third bus bar 516 and the fourth bus bar 518 couple the third group of batteries 410 and 412 in parallel. Series connections between battery groups are formed by the bus bars, specifically the second bus bar 522 connects the positive terminals of the first group of batteries 402 and 404 to the negative terminals of the second group of batteries 406 and 408; and the third bus bar 516 connects the positive terminals of the second group of batteries 406 and 408 to the negative terminals of the third group of batteries 410 and 412. The fourth bus bar 518 is the positive terminal of the battery pack 500.

In battery pack 500 the bus bars are arranged in a layer stack 550. In this stacking arrangement first bus bar 514 and third bus bar 516, which are separated by an air gap or other electrical insulator to prevent short circuiting, are placed in a first layer 530. Similarly, second bus bar 522 and fourth bus bar 518, which are also separated by a gap or insulator, are placed in a third layer 534. Disposed between layers 530 and 534 is an electrically insulating layer 532. To simplify fabrication, the layer stack may be formed using layers of a circuit board, e.g., with the bus bars made of (or on) copper layers or other suitable conductive metal (such as aluminum) and the insulating layer made of resin impregnated fiberglass or other suitable electrically insulating material.

The batteries shown in FIGS. 4 and 5 have a projecting nub as a positive terminal at the top end of the battery and a can, also referred to as a casing, that serves as the negative battery terminal. The batteries are preferably cylindrically shaped with a flat bottom surface, for example utilizing an 18650 form factor. Typically a portion of the negative terminal is located at the top end of the cell, for example due to a casing crimp which is formed when the casing is sealed around the contents of the battery. This crimp or other portion of the negative terminal at the top end of the battery provides physical and electrical access to the battery's negative terminal. The crimp is spaced apart from the peripheral sides of the projecting nub through a gap that may or may not be filled with an insulator.

Preferably in a battery pack such as battery pack 500 in which the battery connections are made at one end of the cells (e.g., end portions 438), a heat sink 552 is thermally coupled to the opposite end portions 440 of each of the batteries. This approach is especially applicable to a coplanar battery arrangement which provides a relatively flat surface to attach a heat sink. Heat sink 552 may be finned or utilize air or liquid coolant passages. If heat sink 552 is air cooled, a fan may be used to provide air flow across one or more heat sink surfaces. In some configurations, heat sink 552 may be attached or affixed to the bottom of a battery holder.

In a typical battery pack in which all battery interconnects are attached to one end of the cells, typically a multi-layer stack (e.g., stack 550) is used in order to provide bus bars for both terminals as well as a suitable insulator located between the bus bars. This approach results in a relatively complex bus bar arrangement. For example, FIG. 6 from co-assigned U.S. patent application Ser. No. 14/203,874, the disclosure of which is incorporated herein for any and all purposes, illustrates a multi-layer bus bar configuration in which the bus bars are stacked with an interposed insulator, and in which each bus bar includes multiple contact fingers 601.

In order to simplify bus bar design and configuration, thereby significantly reducing material and fabrication costs as well as overall battery pack complexity, the battery pack may be configured with a series of non-overlapping bus bars of alternating polarity. Such a configuration is disclosed in co-assigned U.S. patent application Ser. No. 14/802,207, filed 17 Jul. 2015, the disclosure of which is incorporated herein for any and all purposes. Although this approach may be used throughout the entire battery pack, preferably it is used to form battery modules, where the battery modules are then electrically coupled to form the battery pack. Assuming the battery pack is used in an electric vehicle as preferred, the individual battery modules may be contained within a single battery pack enclosure, or within multiple enclosures, the latter approach allowing subsets of modules to be distributed throughout the vehicle in order to obtain a particular weight distribution or to fit within the confines of a particular vehicle envelope or structure.

Figure 7:
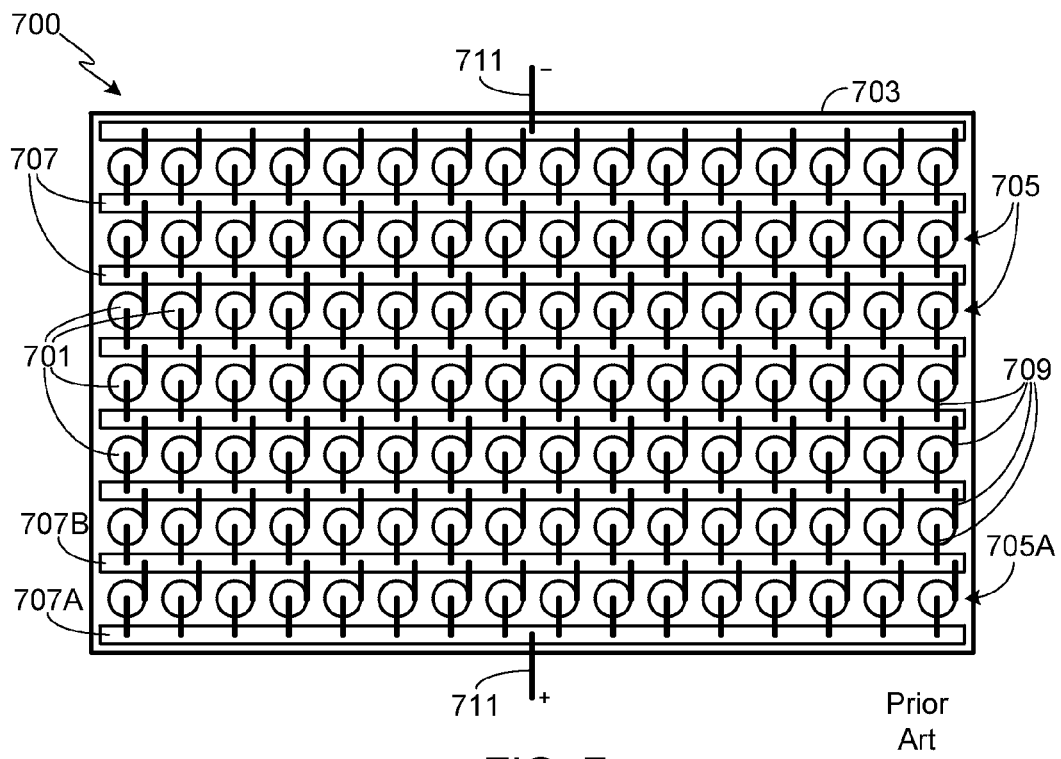
FIG. 7 provides a top view of a battery module utilizing a series of non-overlapping bus bars of alternating polarity in accordance with the prior invention.

FIG. 7 provides a top view of a battery module 700 utilizing a series of non-overlapping bus bars of alternating polarity. Visible in FIG. 7 is the end portion of each of a plurality of batteries 701, where the end portions are accessible through corresponding apertures in an upper tray member 703. Tray member 703 is prepared and/or treated to provide electrical isolation between the batteries, for example by fabricating the tray member from an electrically insulative material such as a plastic, or coating the tray member with an electrically insulative material. The batteries are divided into a plurality of rows 705, where each row 705 includes sixteen batteries 701. Even though module 700 is shown with seven rows 705, it should be understood that this design is not limited to configurations utilizing this number of battery rows, and therefore is equally applicable to configurations utilizing a fewer number, or a greater number, of battery rows 705. Similarly, the design is not limited to configurations in which each battery row is comprised of sixteen batteries, rather the design may be used with configurations using a fewer number, or a greater number, of batteries 701 per battery row 705.

Figure 6:
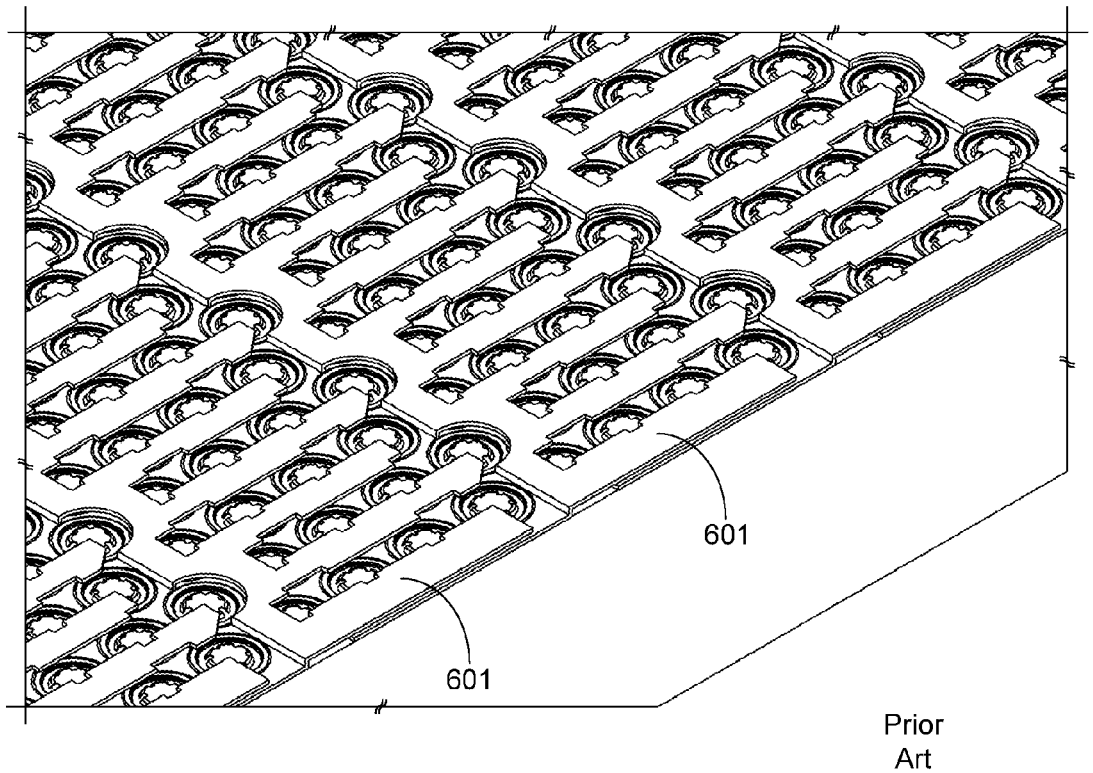
FIG. 6 provides a detailed perspective view of the bus bars in a particular layer stack configuration in accordance with the prior art.

In the configuration illustrated in FIG. 7, interposed between battery rows 705 are linear bus bars 707, where each bus bar 707 is devoid of the contact fingers utilized in the prior art approach shown in FIG. 6. Bus bars 707 are preferably made of copper, although other suitable electrically conductive materials such as aluminum may be used. Although this approach may utilize any battery type that provides access to both terminals at a single end portion of the battery, in the illustrated assembly batteries 701 are cylindrical, preferably utilizing an 18650 form factor.

The batteries within a single row 705 form a group with all terminals of a first polarity being electrically connected to a single bus bar on one side of the battery row, and all terminals of the second polarity being electrically connected to a single bus bar on the other side of the battery row. For example, all positive terminals of battery row 705A are electrically connected to bus bar 707A and all negative terminals of battery row 705A are electrically connected to bus bar 707B. As a result of this approach, each group of batteries represented by a single row are electrically connected in parallel while the battery rows within a single module 700 are electrically connected in series. By varying the number of batteries within a single row, as well as the number of rows within a single module, the desired voltage and current capabilities of the module may be configured as desired to meet the design criteria for a specific application.

Preferably module 700 uses wire bond interconnects 709 to electrically couple the batteries 701 to the bus bars 707. Wire bond interconnects 709 may be attached using any wire bonding technique suitable for the selected wire gauge, wire material and bus bar material. Typical wire bonding techniques include, but are not limited to, bonding, resistance bonding, thermocompression bonding, thermosonic bonding and laser bonding.

Figure 8:
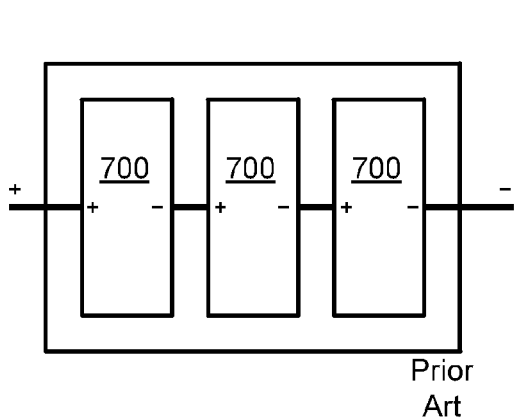
FIG. 8 provides a schematic diagram of a battery pack utilizing a plurality of the battery modules shown in FIG. 7 combined in a series configuration.
Figure 9:
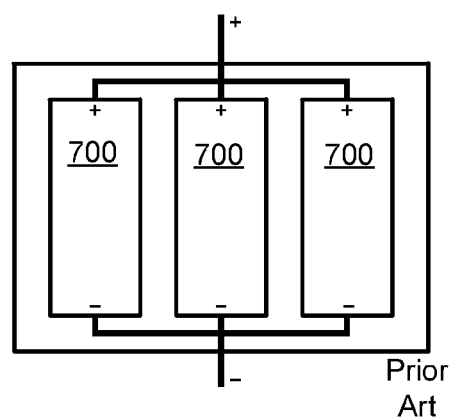
FIG. 9 provides a schematic diagram of a battery pack utilizing a plurality of the battery modules shown in FIG. 7 combined in a parallel configuration.

As previously noted, module 700 may be configured as the entire battery pack. For some applications, however, multiple modules 700 may be electrically interconnected in order to achieve the desired battery pack output characteristics. For example, modules 700 may be electrically interconnected in series as illustrated in FIG. 8, or electrically interconnected in parallel as illustrated in FIG. 9. Other series/parallel arrangements may be used with the invention.

Figure 10:
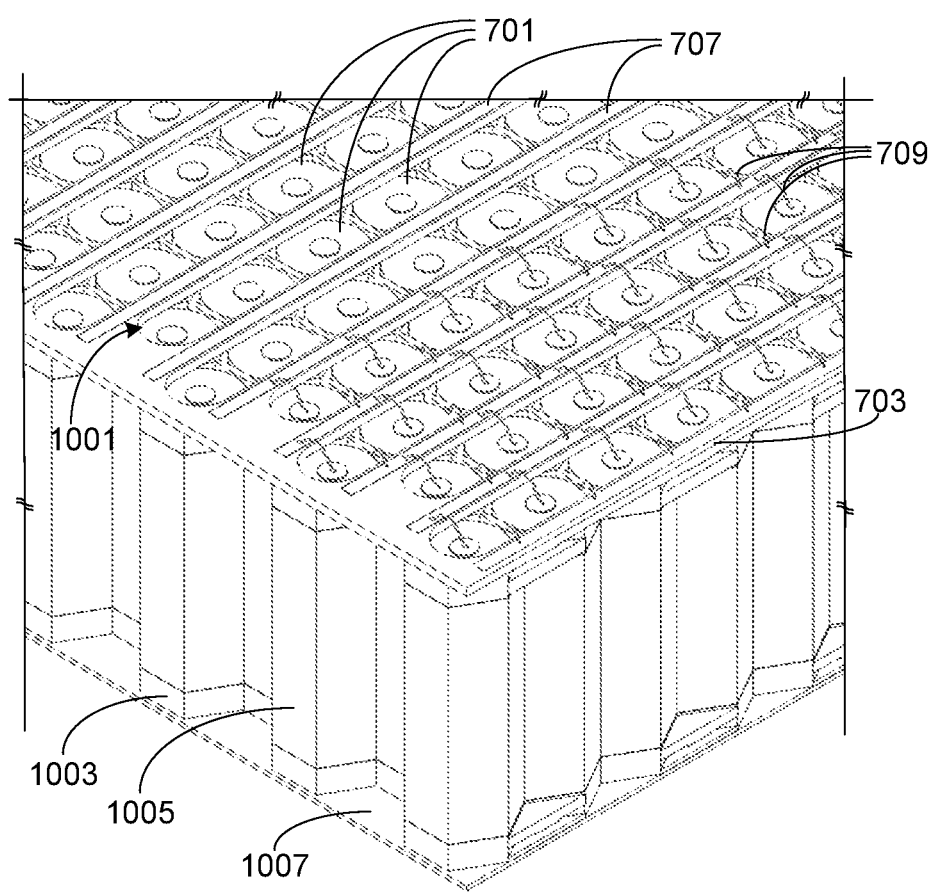
FIG. 10 provides a perspective view of a portion of a battery module such as that shown in FIG. 7.

FIG. 10 provides a perspective view of a portion of a battery module such as the module shown in FIG. 7. For clarity only a portion of the illustrated batteries shown in FIG. 10 are interconnected to adjacent bus bars. This figure shows a clearer view of the access apertures 1001 fabricated into upper tray member 703, apertures 1001 allowing access to the battery terminals located at the ends of the batteries. The access apertures 1001 utilized in the illustrated embodiment are continuous slots that provide easy electrical access to all of the batteries within a single row while still holding the batteries in place. Thus in this configuration there is a single access aperture per battery group. It should be understood, however, that access apertures 1001 may utilize an alternate shape and may be configured to allow access to more or less than a battery group. For example, the access apertures may be configured with a circular or elliptical shape with one opening per battery, or one opening per sub-group of batteries (e.g., two or more batteries).

Upper tray member 703, which may be molded, cast, printed using a 3D printer, or fabricated using an alternate technique, is preferably fabricated from a plastic material, although other materials may also be used to fabricate the tray member. In a preferred embodiment, bus bars 707 are integrated into upper tray member 703, for example by molding the bus bars into the tray member during tray member fabrication. Alternately, bus bars 707 may be bonded into slots molded into the upper tray member 703. Integrating the bus bars into the upper surface of tray member 403 insures that the bus bars are properly positioned during the battery interconnection process and that they remain in position after pack fabrication, thus minimizing stress and damage to the battery interconnects.

In accordance with the invention, a high current fuse with a short time constant is provided for use in an EV. The fuse is designed to exhibit thermal characteristics that are similar to, if not substantially identical to, those of the wire bond interconnects used in the EV's battery pack. As a result, the system does not go into an overheat protection condition when the system is subjected to repetitive high current cycles, such as those common during aggressive and/or spirited driving.

FIG. 11 provides a top view of a fuse assembly 1100 in accordance with one embodiment of the invention. FIGS. 12 and 13 provide orthogonal side views of the same assembly 1100. Base 1101 of fuse assembly 1100 is fabricated from an electrically insulative material, typically plastic (e.g., polycarbonate, acrylonitrile butadiene styrene (ABS), polypropylene (PP), polyethylene (PE), polyethylene terephthalate (PET), nylon, etc.), although other materials may be used as long as the material is electrically insulating. Attached to, or integrated into, top surface 1103 of base 1101 are two bus bars 1105 and 1106, the bus bars fabricated from copper, aluminum or other suitable electrically conductive material. Bus bars 1105 and 1106 may be bonded, bolted or otherwise attached to surface 1103 of base 1101. Alternately, bus bars 1105 and 1106 may be molded into base 1101. Alternately, bus bars 1105 and 1106 may be bonded into slots molded into surface 1103 of base 1101. Integrating the bus bars into the upper surface 1103 of base 1101 insures that the bus bars are properly positioned during fuse fabrication and remain properly positioned during the life of the fuse assembly. Additionally, if the top surfaces of the bus bars and base 1101 are coplanar, the risk of arcing is reducing when the fuse blows. FIG. 14 provides a cross-sectional view of an embodiment of the fuse assembly with the bus bars integrated into the base such that the top surfaces of each are coplanar.

Electrically connecting bus bar 1105 to bus bar 1106 is a plurality of wire bond interconnects 1107. Wire bond interconnects 1107 may be attached to bus bars 1105 and 1106 using any wire bonding technique suitable for the selected wire gauge, wire material and bus bar material. Typical wire bonding techniques include, but are not limited to, ultrasonic bonding, resistance bonding, thermocompression bonding, thermosonic bonding and laser bonding. Wire bond interconnects 1107 are configured to exhibit similar thermal characteristics to those of the wire bonds used in the fabrication of the EV's battery pack (e.g., wire bonds 425 in FIGS. 4 and 5, wire bonds 709 in FIG. 7, etc.) and as such are preferably fabricated from the same material, and of the same gauge wire, as the battery pack interconnects. The number of wire bond interconnects 1107 used in fuse assembly 1100 is selected to provide the desired current handling capability for the EV's electrical system, thereby insuring that fuse assembly 1100 blows when intended, i.e., before any components within the battery pack or drive train can sustain damage. In order to insure that fuse assembly 1100 blows before any of the interconnects used in the EV's battery pack can be damaged, the total number of interconnects connected in parallel between fuse bus bars 1105 and 1106 is less than the total number of wire bond interconnects installed in parallel within the battery pack, or within a battery module of the EV's battery pack. For example, assuming a battery pack with 70 batteries connected in parallel such that there are 70 parallel battery interconnects to a first bus bar and 70 parallel battery interconnects to a second bus bar, then the number of wire bond interconnects 1107 in fuse assembly 1100 would be set to a value of less than 70, e.g., 65 wire bond interconnects 1107. In a battery pack using both parallel and serially connected batteries, the number of battery pack wire bonds used as the baseline in determining the number of wire bond interconnects in the fuse assembly is the total number of parallel interconnects corresponding to a single group of parallel connected batteries. Thus in the assembly shown in FIG. 7 where there are 7 sets of 16 parallel batteries, the number of wire bond interconnects installed in parallel is 16, i.e., 16 parallel coupled batteries with 16 parallel wire bond interconnects to a first bus bar and 16 parallel wire bond interconnects to a second bus bar. Thus in this example the number of interconnects 1107 in fuse assembly 1100 would be set to a value of less than 16. Preferably the total number of wire bond interconnects in fuse assembly 1100 is between 70 and 99 percent of the total number of parallel connected wire bond interconnects in the EV's battery pack, or battery pack module; alternately, the total number of wire bond interconnects in fuse assembly 1100 is between 80 and 95 percent of the total number of parallel connected wire bond interconnects in the EV's battery pack; alternately, the total number of wire bond interconnects in fuse assembly 1100 is between 85 and 90 percent of the total number of parallel connected wire bond interconnects in the EV's battery pack. As a result of this design, fuse assembly 1100 would blow before any of the battery interconnects are damaged during a current spike.

Figure 18:
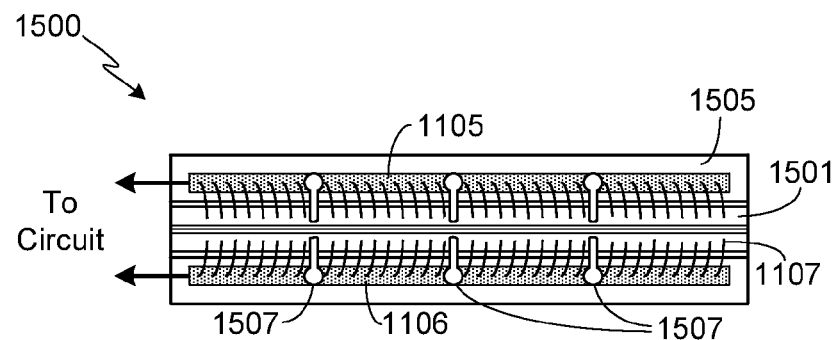
FIG. 18 provides a top view of the fuse assembly shown in FIG. 15 after the wire bond interconnects and the fusible links have blown and the arc suppression member has moved into place.
Figure 19:
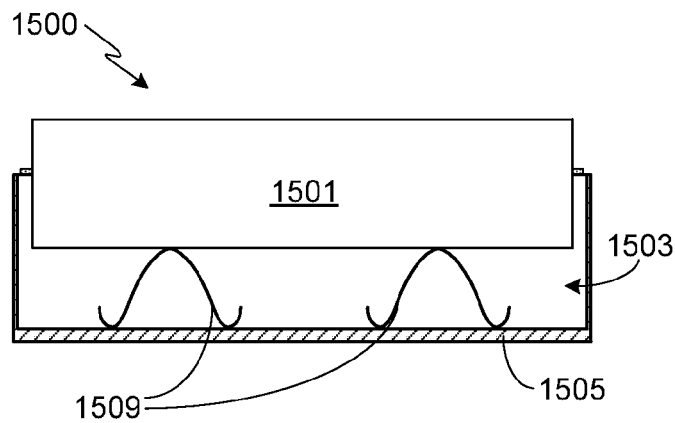
FIG. 19 provides a first cross-sectional view, similar to that shown in FIG. 16, after the wire bond interconnects and the fusible links have blown and the arc suppression member has moved into place.
Figure 20:
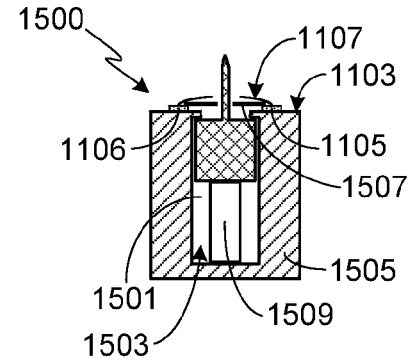
FIG. 20 provides a second cross-sectional view, similar to that shown in FIG. 17, after the wire bond interconnects and the fusible links have blown and the arc suppression member has moved into place.

FIGS. 15-20 illustrate an alternate embodiment of the invention, this embodiment adding an arc suppression member to the fuse assembly shown in FIGS. 11-14. As shown, arc suppression member 1501 is held within a channel 1503 fabricated within base 1505. As in fuse assembly 1100, base 1505 is fabricated from an electrically insulative material such as a plastic. Arc suppression member 1501 is held within base 1505 by a plurality of fusible links 1507. Fusible links 1507 are fabricated from a material with a much higher electrical resistance than wire bond interconnects 1107, thus during normal operation very little current passes through them. Preferably the resistivity of fusible links 1507 is at least 2 times the resistivity of wire bond interconnects 1107; alternately, the resistivity of fusible links 1507 is at least 10 times the resistivity of wire bond interconnects 1107; alternately, the resistivity of fusible links 1507 is at least 100 times the resistivity of wire bond interconnects 1107; alternately, the resistivity of fusible links 1507 is at least 1,000 times the resistivity of wire bond interconnects 1107. Once fuse assembly 1500 blows, however, all of the current passes through fusible links 1507, causing them to immediately fuse. After fusible links 1507 fuse, spring assembly 1509 forces arc suppression member 1501 partially out of the base 1505 as illustrated in FIGS. 18-20. Preferably stops 1511 are used to prevent arc suppression member 1501 from being forced completely out of the fuse assembly. As arc suppression member 1501 is fabricated from an electrically insulative material, such as a plastic or a ceramic, arcing between bus bars 1105 and 1106, or between portions of the blown wire bond interconnects 1107 and/or fusible links 1507, is suppressed.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. An electrical circuit, comprising:
    a battery pack, said battery pack comprising:
        a plurality of batteries;
        a first battery pack bus bar; and
        a first plurality of wire bond interconnects electrically connecting said plurality of batteries to said first battery pack bus bar, wherein a first end portion of each wire bond interconnect of said first plurality of wire bond interconnects is attached to said first battery pack bus bar, wherein a second end portion of each wire bond interconnect of said first plurality of wire bond interconnects distal from said first end portion is attached to a first battery terminal of a corresponding one of said plurality of batteries, and wherein each of said first plurality of wire bond interconnects is fabricated from a first material and is of a first wire gauge;
    a fuse assembly electrically connected to said battery pack, said fuse assembly configured to blow during a current spike prior to said first plurality of wire bond interconnects being damaged, said fuse assembly comprising;
        a first fuse bus bar;
        a second fuse bus bar;
        a second plurality of wire bond interconnects electrically connecting said first fuse bus bar to said second fuse bus bar, wherein said second plurality of wire bond interconnects are connected in parallel between said first and second fuse bus bars, wherein a first total number of wire bond interconnects corresponding to said second plurality of wire bond interconnects is less than a second total number of wire bond interconnects corresponding to said first plurality of wire bond interconnects, and wherein each of said second plurality of wire bond interconnects is fabricated from said first material and is of said first wire gauge;
        an arc suppression member fabricated from an electrically insulating material; and
        a spring assembly, wherein said spring assembly forces a portion of said arc suppression member between said first and second fuse bus bars when said second plurality of wire bond interconnects blow during said current spike; and
    a load electrically connected to said battery pack and said fuse assembly.

2. The electrical circuit of claim 1, said fuse assembly further comprising at least one fusible link electrically connecting said first fuse bus bar to said second fuse bus bar, wherein said at least one fusible link is fabricated from a second material, wherein a first resistivity corresponding to said second material is higher than a second resistivity corresponding to said first material, wherein said at least one fusible link maintains said arc suppression member in a first position prior to said current spike, wherein said at least one fusible link fuses after said second plurality of wire bond interconnects blow during said current spike, wherein when said at least one fusible link fuses said spring assembly forces said arc suppression member into a second position, and wherein said arc suppression member in said second position locates said portion of said arc suppression member between said first and second fuse bus bars.

3. The electrical circuit of claim 2, wherein said first resistivity is at least 2 times higher than said second resistivity.

4. The electrical circuit of claim 3, wherein said first resistivity is at least 10 times higher than said second resistivity.

5. The electrical circuit of claim 4, wherein said first resistivity is at least 100 times higher than said second resistivity.

6. The electrical circuit of claim 5, wherein said first resistivity is at least 1,000 times higher than said second resistivity.

7. The electrical circuit of claim 1, said fuse assembly further comprising an electrically insulating base, wherein said first fuse bus bar is attached to a surface of said electrically insulating base, and wherein said second fuse bus bar is attached to said surface of said electrically insulating base.

8. The electrical circuit of claim 7, said electrically insulating base further comprising a channel positioned between said first and second fuse bus bars, wherein said arc suppression member is located within said channel.

9. The electrical circuit of claim 8, wherein said spring assembly is located within said channel.

10. The electrical circuit of claim 9, wherein said spring assembly is positioned between a second surface of said electrically insulating base and a lower surface of said arc suppression member.

11. The electrical circuit of claim 8, said fuse assembly further comprising at least one fusible link electrically connecting said first fuse bus bar to said second fuse bus bar, wherein a first resistivity corresponding to said second material is higher than a second resistivity corresponding to said first material, wherein said at least one fusible link maintains said arc suppression member in a first position within said channel prior to said current spike, wherein said at least one fusible link fuses after said second plurality of wire bond interconnects blow during said current spike, wherein when said at least one fusible link fuses said spring assembly forces said arc suppression member into a second position, wherein said arc suppression member in said second position extends at least partially out of said channel and is located between said first and second fuse bus bars.

12. The electrical circuit of claim 7, wherein a first upper surface corresponding to said first fuse bus bar is coplanar with said surface of said electrically insulating base, and wherein a second upper surface corresponding to said second fuse bus bar is coplanar with said surface of said electrically insulating base.

13. The electrical circuit of claim 7, wherein said first fuse bus bar and said second fuse bus bar are molded into said surface of said electrically insulating base.

14. The electrical circuit of claim 7, wherein said first fuse bus bar and said second fuse bus bar are bonded to said surface of said electrically insulating base.

15. The electrical circuit of claim 1, wherein said first total number of wire bond interconnects corresponding to said second plurality of wire bond interconnects is equivalent to between 70 and 99 percent of said second total number of wire bond interconnects corresponding to said first plurality of wire bond interconnects.

16. The electrical circuit of claim 15, wherein said first total number of wire bond interconnects corresponding to said second plurality of wire bond interconnects is equivalent to between 80 and 95 percent of said second total number of wire bond interconnects corresponding to said first plurality of wire bond interconnects.

17. The electrical circuit of claim 16, wherein said first total number of wire bond interconnects corresponding to said second plurality of wire bond interconnects is equivalent to between 85 and 90 percent of said second total number of wire bond interconnects corresponding to said first plurality of wire bond interconnects.

18. The electrical circuit of claim 1, wherein said first and second battery pack bus bars are fabricated from a material selected from the group consisting of aluminum and copper.

19. The electrical circuit of claim 1, said battery pack further comprising:
   a second battery pack bus bar; and
   a third plurality of wire bond interconnects electrically connecting said plurality of batteries to said second battery pack bus bar, wherein a first end portion of each wire bond interconnect of said third plurality of wire bond interconnects is attached to said second battery pack bus bar, wherein a second end portion of each wire bond interconnect of said third plurality of wire bond interconnects distal from said first end portion is attached to a second battery terminal of a corresponding one of said plurality of batteries, wherein each of said third plurality of wire bond interconnects is fabricated from said first material and is of said first wire gauge.

20. The electrical circuit of claim 19, wherein said first plurality of wire bond interconnects are coupled to said plurality of batteries and to said first battery pack bus bar utilizing a bonding technique selected from the group consisting of ultrasonic bonding, resistance bonding, thermocompression bonding, thermosonic bonding and laser bonding, and wherein said third plurality of wire bond interconnects are coupled to said plurality of batteries and to said second battery pack bus bar utilizing said bonding technique selected from the group consisting of ultrasonic bonding, resistance bonding, thermocompression bonding, thermosonic bonding and laser bonding.

21. The electrical circuit of claim 1, wherein said second plurality of wire bond interconnects are coupled to said first and second fuse bus bars utilizing a bonding technique selected from the group consisting of ultrasonic bonding, resistance bonding, thermocompression bonding, thermosonic bonding and laser bonding.

\* \* \* \* \*